Aug. 24, 1965  H. G. JENSEN  3,202,256
MULTIPLE PRICING CREDIT MECHANISM FOR
COIN-RESPONSIVE EQUIPMENT
Filed Aug. 9, 1963  6 Sheets-Sheet 1

INVENTOR.
HERMAN G. JENSEN
BY
ATTY.

Aug. 24, 1965 H. G. JENSEN 3,202,256
MULTIPLE PRICING CREDIT MECHANISM FOR
COIN-RESPONSIVE EQUIPMENT
Filed Aug. 9, 1963 6 Sheets-Sheet 3

INVENTOR.
HERMAN G. JENSEN

Aug. 24, 1965

H. G. JENSEN

3,202,256

MULTIPLE PRICING CREDIT MECHANISM FOR
COIN-RESPONSIVE EQUIPMENT

Filed Aug. 9, 1963

INVENTOR.
HERMAN G. JENSEN
BY
ATTY.

Aug. 24, 1965           H. G. JENSEN           3,202,256
MULTIPLE PRICING CREDIT MECHANISM FOR
COIN-RESPONSIVE EQUIPMENT Filed Aug. 9, 1963           6 Sheets-Sheet 5

INVENTOR.
HERMAN G. JENSEN
BY
ATTY.

United States Patent Office 3,202,256
Patented Aug. 24, 1965

3,202,256
MULTIPLE PRICING CREDIT MECHANISM FOR COIN-RESPONSIVE EQUIPMENT
Herman G. Jensen, Chicago, Ill., assignor to The Seeburg Corporation, Chicago, Ill.
Filed Aug. 9, 1963, Ser. No. 301,064
15 Claims. (Cl. 194—15)

This invention relates to a multiple pricing credit mechanism and more particularly to such a mechanism adapted for signaling and for erasing credit values established in coin-responsive equipment such as vending equipment which is operated by the deposit of coins in order to dispense merchandise or services.

In the particular embodiment disclosed herein, the invention is described with reference to a coin-operated phonograph installation which can vend either single selections (i.e., regular play records) or album selections (i.e., long-playing records). The invention is designed to signal the establishment of sufficient credit for an album selection and correspondingly to erase the established credit values when a given album selection has been made. The embodiment disclosed herein takes the form of a driving gear member having two ratchet segments on each side thereof. The gear member is mounted on a drive shaft which is rotated for one cycle of revolution by appropriate circuitry means, including a drive motor. The gear member may be fitted on the drive shaft by appropriate positioning such that any one of its four ratchet segments is disposed in alignment with the ratchet teeth of an advancing-type ratchet credit wheel in order to effect removal of established credit values by appropriate rotation of the gear member. Each ratchet segment is adapted to remove a different amount of established credit so that the drive gear functions as a means for predetermining the extent of the credit removal for each album play.

Credit switching means are also provided in the drive motor circuitry means so that the establishment of sufficient credit for an album play can set the credit canceling drive motor for activation upon the actual album selection. The credit switching means are adapted to be located at various positions relative to a zero credit or rest reference position of the ratchet credit wheel so that selectively variable credit values can be utilized to determine the price of an actual album selection. The circuitry means further comprise cam-operated carry-over switching means for insuring one cycle of revolution for the drive motor in response to the selection of an album play and cam-operated anti-cheat switching means for insuring against the selection of an album play when insufficient credit is established in the coin-operated phonograph.

Accordingly, it is a primary object of this invention to provide a multiple pricing credit mechanism for signaling and for erasing the establishment of selectively variable credit values in coin-responsive equipment.

It is a more specific object of this invention to provide such a mechanism for use in a coin-operated phonograph installation such that credit values established by the deposit of coins may be signaled and erased in accordance with selectively predetermined pricing sequences.

It is still another object of this invention to provide a multiple pricing credit mechanism for use in a coin-operated phonograph installation which is adapted to vend album play or long-playing records in response to the deposit of coins therein and which is provided with anti-cheat means for differentiating between the said album play and single or regular play selections.

It is still another object of this invention to provide a compact, versatile, and reliable multiple pricing credit mechanism which is adapted for use in coin-responsive equipment, such as coin-operated phonograph installations or other types of vending equipment.

These and other objects, advantages, and features of the subject invention will hereinafter appear, and, for purposes of illustration, but not of limitation, an exemplary embodiment of the subject invention is shown in the appended drawings, in which:

An embodiment of the invention is described herein by exemplary reference to a coin-operated phonograph installation and in particular by reference to a Kiefer and Jensen co-pending application Serial No. 134,007, filed August 25, 1961, now United States Patent No. 3,146,339, issued November 10, 1964. The multiple pricing credit mechanism shown in the instant drawings and identified by the general reference numeral 1 is in actual practice adapted to cooperate with a slightly modified version of the credit mechanism shown in the co-pending application, the said modification residing in the deletion of the so-called multiple pricing solenoid shown and described in the co-pending application and the corresponding incorporation of the multiple pricing credit mechanism 1 shown and described herein. While the multiple pricing solenoid of the co-pending application is satisfactory for the removal of a predetermined amount of established credit values in instances of selection of album or long-playing records in an automatic coin-operated phonograph equipped to vend both regular and long-playing records, the present multiple pricing credit mechanism 1 provides a much higher degree of versatility in that establishment and removal of credit for album or long-playing records may be effected with a range of credit values per selection and in that anti-cheat means are provided to insure against the selection of a long-playing record when only single or regular record credit values have been established. Thus, for convenience of the description, the multiple pricing credit mechanism 1 constituting the subject invention will be described with reference to a ratchet credit wheel of the type shown and described in the co-pending application, which credit wheel is adapted for incremental rotation in a given direction corresponding to the units of credit established by the deposit of coins in the coin-operated phonograph and for incremental rotation in an opposite direction corresponding to the units of credit extinguished by the selection of regular or single selection records (which, for example, may be one, two, or three credit units for single selection, as hereinafter described).

As described herein, the general function of the multiple pricing credit mechanism 1 is to provide credit subtracting rotation for the ratchet credit wheel in the indicated opposite direction corresponding to the units of credit extinguished by the selection of album or long playing selection records, while providing means for varying the number of credit values required to select an album or long-playing selection and for correspondingly varying the number of credit values extinguished upon selection of such an album or long-playing record, as well as means for preventing the selection of an album or long-playing record unless sufficient credit values have been established by rotation of the ratchet credit wheel. However, notwithstanding the indicated cooperation between the multiple pricing credit mechanism 1 as described herein and the credit mechanism of the co-pending application, it will readily be appreciated by one skilled in the art that the instant invention may be utilized with various types of ratchet credit wheels regardless of how driven and in fact may be utilized with various types of vending machinery other than the coin-operated phonograph units referred to herein.

Figure 1:
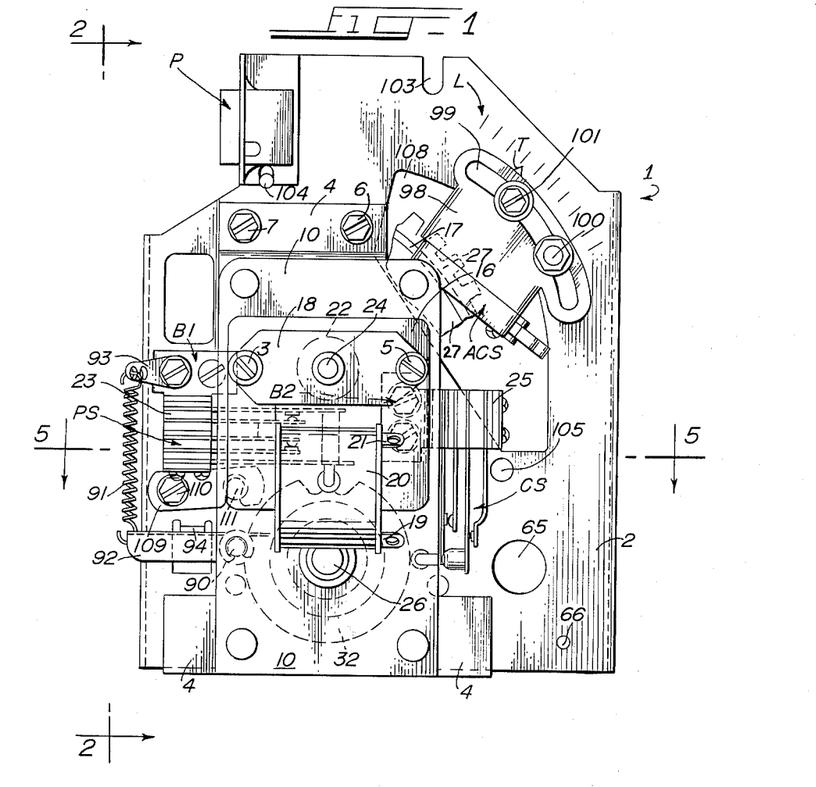
FIGURE 1 is a top plan view of a multiple pricing credit mechanism produced in accordance with the subject invention.
Figure 5:
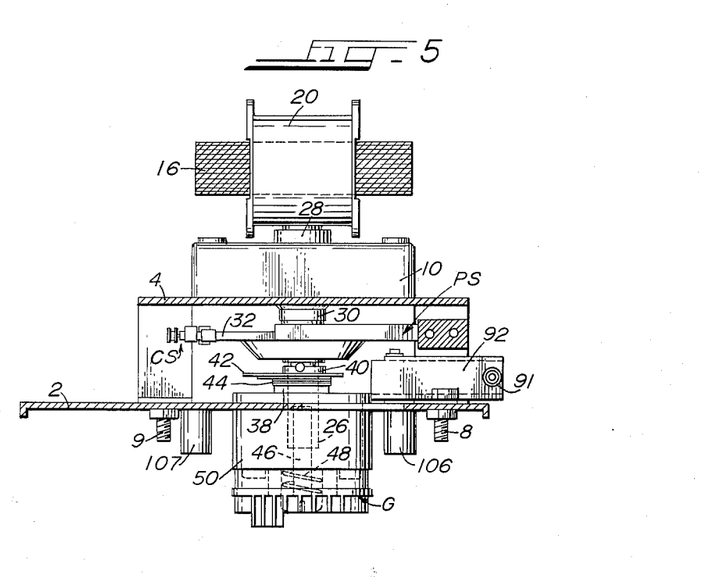
FIGURE 5 is a sectional view taken along the line 5—5 of FIGURE 1.

With particular reference to the drawings, it will be seen that the multiple pricing credit mechanism 1 comprises a frame 2 which is adapted for placement in parallel alignment with a ratchet credit wheel 27 (see FIGURE 2) of the type described in the aforementioned co-pending application. The credit wheel 27 is adapted to advance one angular tooth increment for each unit of credit established by the deposit of coins in the coin-operated phonograph installation. Bearing pillers 106 and 107 (FIGURES 3 and 5) and openings 103, 104, 105, and 111 (FIGURE 1) are provided in the frame 2 so that the frame 2 and the parts mounted thereupon may be disposed in the indicated parallel relationship with the ratchet credit wheel 27 (by conventional mounting means not shown) for cooperation in a manner hereinafter described. A latch 109 is mounted on the frame 2 overlying the opening 111 by a bolt 110 in order to aid in the mounting of the frame 2 relative to the frame (not shown) upon which the credit wheel 27 is mounted for rotation.

A mounting plate 4 is secured to the frame 2 by bolts 6–9, and a gear casing 10 is affixed to the top of the mounting plate 4. Pillers 12 and 14 (FIGURES 2 and 3) extend perpendicularly upwardly from the gear casing 10 in parallel alignment, and one leg of a square-O laminated plate assembly 16 is mounted on the pillers 12 and 14 by a C-shaped yoke 18 which is provided with bolts 3 and 5 for securing the laminated plate assembly 16 to the pillers 12 and 14. A winding coil assembly 20 surrounds another leg of the laminated plate assembly 16, and terminals 19 and 21 (FIGURE 1) are provided for appropriate energization of the winding coil assembly 20, in a conventional manner. A rotor shaft 24 is journaled for rotation in the yoke 18 and in the gear casing 10, and the shaft 24 carries an electromagnetic rotor element 22, in a conventional manner. The laminated plate assembly 16, winding coil assembly 20, shaft 24, and rotor element 22 constitute a conventional electric motor generally indicated by the reference character M in FIGURE 2.

Figures 3, 4:
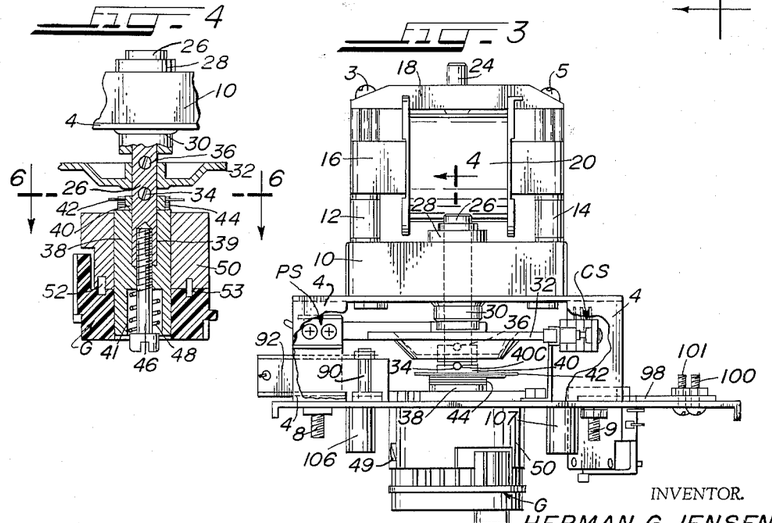
FIGURE 3 is a front elevational view taken along the line 3—3 of FIGURE 2.
FIGURE 4 is a fragmentary sectional view taken along the line 4—4 of FIGURE 3.

A drive shaft 26 is rotatably journaled in the gear casing 10 by upper and lower bearings 28 and 30 respectively. Energization of the motor M effects rotation of the drive shaft 26 via conventional gear reduction means (not shown) in the gear casing 10. A dish shaped rotary cam 32 (best illustrated in FIGURE 10) is affixed to the shaft 26 for rotation therewith by pins 34 and 36 (FIGURES 3 and 4). The cam 32 is provided with a dwell recessed surface 33 and with a lobe raised surface 35 for cooperation with a pulse switching assembly generally indicated by PS and a carry-over switching assembly generally indicated by CS (see FIGURE 10), as hereinafter described.

Figure 6:
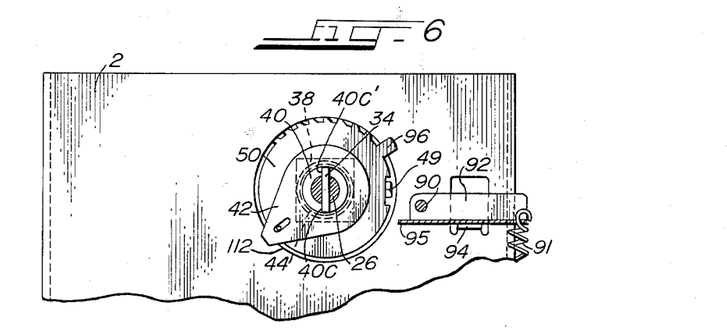
FIGURE 6 is a fragmentary sectional view taken along the lines 6—6 of FIGURE 4.

As best seen in FIGURE 4, a hollow rectangular clutch bearing 38 is affixed to the lowermost end of the shaft 26, which extends through an opening 112 in the frame 2 (see FIGURE 6). The clutch bearing 38 is provided with an upper hollow chamber 39 and with a lower hollow chamber 41. The lowermost extremity of the shaft 26, which is provided with interior threading, is received in the upper hollow chamber 39, and a bolt 46 passes through the clutch bearing 38 and is threadably received within the lowermost extremity of the shaft 26. A helical spring 44 is disposed within the lower chamber 41 and surrounds the bolt 46, which is tightened against the force of the spring 48.

The rectangular clutch bearing 38 is provided with a cylindrical head portion 40 which, as best shown in FIGURES 3 and 6, is provided with diametrically opposed cradles 40c and 40c' for seating the pin 34 of shaft 26 when the bolt 46 is tightened into the lowermost extremity of the shaft 26. A tear-shaped latch 42 is rotatably journaled on the cylindrical head portion 40, and a torsion spring 44, which interconnects the latch 42 and the clutch bearing 38, is wrapped about the cylindrical head portion 40 so as to bias the latch 42 in a clockwise direction (relative to its FIGURE 6 disposition).

Figure 9:
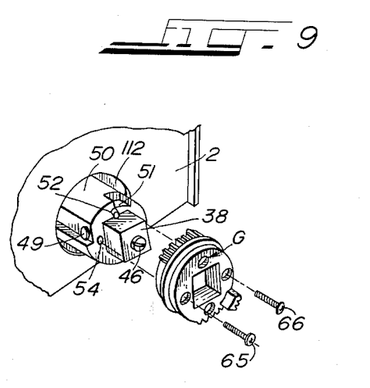
FIGURE 9 is an exploded perspective view showing the driving gear and mounting means therefor.

As indicated in FIGURES 4 and 9, a barrel mounting 50 is received on the exterior of the clutch bearing 38. The barrel mounting 50 has a generally cylindrical exterior and a rectangular interior such that the exterior surface of the rectangular clutch bearing 38 serves as a male member for insertion in the female barrel mounting 50. A set screw 49 passes through the barrel mounting 50 and is adapted to fix the position of the barrel mounting 50 on the clutch bearing 38 at one of two alternate positions ("in" and "out") which are axially displaced relative to each other, as hereinafter described. The barrel mounting 50 is provided with a cut-away portion 51 (FIGURE 9), two diametrically opposed stud pins 52 and 53, and two diametrically opposed threaded apertures (only the aperture 54 being shown in FIGURE 9, since the aperture diametrically opposed thereto is obscured from view in the drawings).

Figure 11:
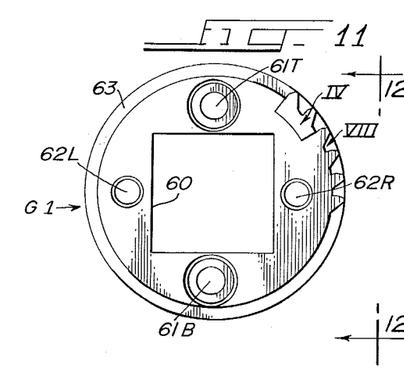
FIGURE 11 is an enlarged top plan view of a specific form of driving gear which may be utilized in the practice of the invention.
Figure 12:
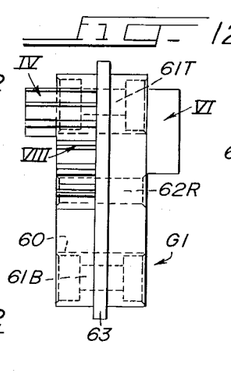
FIGURE 12 is a side elevational view taken along the line 12—12 of FIGURE 11.
Figure 13:
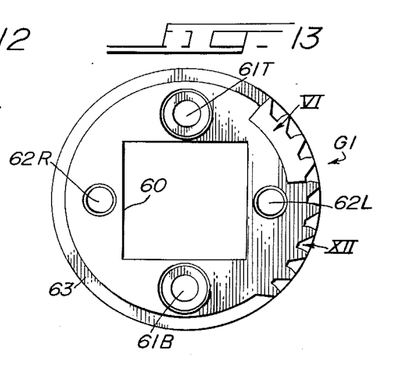
FIGURE 13 is a bottom plan view of the driving gear shown in FIGURES 11 and 12.
Figure 14:
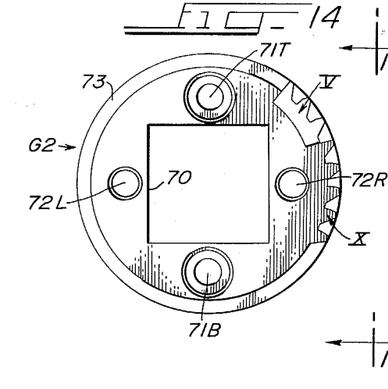
FIGURE 14 is a view similar to FIGURE 11 showing another specific form of driving gear which may be utilized in the practice of the subject invention.
Figure 15:
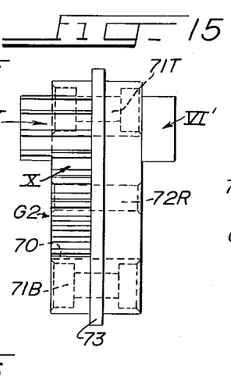
FIGURE 15 is a view similar to FIGURE 12 taken along the line 15—15 of FIGURE 14.
Figure 16:
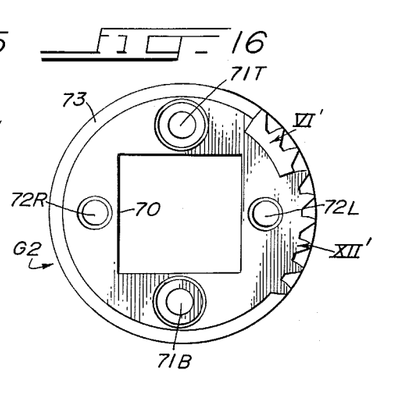
FIGURE 16 is a view similar to FIGURE 13 of the driving gear shown in FIGURES 14 and 15.

A driving gear is generally indicated by G in FIGURES 2–5 and 7–9, and this driving gear is adapted for mounting on the rectangular clutch bearing 38 adjacent the barrel mounting 50, as hereinafter described. FIGURES 11–13 illustrate a specific driving gear member G1 and FIGURES 14–16 illustrate another specific driving gear member G2 which may be utilized in the practice of the subject invention. The gear member G1 is a generally cylindrical member provided with top and bottom apertures 61T and 61B and with left and right apertures 62L and 62R. Also, the gear member G1 is provided with a rectangular hollow opening 60 so that the gear member G1 may be placed on the rectangular clutch bearing 38 with the apertures 62L and 62R being placed on the stud pins 52 and 53 and with the apertures 61T and 61B overlying the threaded apertures of the barrel mounting 50. Appropriate screw means, such as the screws 65 and 66 shown in FIGURE 9, are then threaded into the threaded apertures of the barrel mounting 50 through the respective apertures 61T and 61B in order to secure the gear member G1 to the barrel mounting 50. As indicated in FIGURE 12, the apertures 61T and 61B have a generally I-shaped cross section so that the heads of the screws which pass therethrough may be received beneath the opposite surfaces of the gear member G1, depending upon which side thereof is placed adjacent the barrel mounting 50.

The gear member G1 is provided with an annular radially extending rib 63, and four ratchet segments (two on each side) are provided on the exterior cylindrical surface of the gear member G1 adjacent the rib 63. As shown in FIGURE 11, a first ratchet segment comprising six ratchet teeth is generally indicated by VIII. A second ratchet segment comprising two ratchet teeth is generally indicated by IV. As best shown in FIGURE 12, the ratchet segment IV actually comprises an axial extension of the two uppermost ratchet teeth of the ratchet segment VIII so that the segments IV and VIII in effect share two ratchet teeth. In other words, the ratchet segment VIII comprises four short teeth plus about half of two long teeth, while the ratchet segment IV comprises the remaining portion of the said two long teeth. Similarly, on the opposite side of the gear member G1 a ratchet segment comprising ten ratchet teeth is generally indicated by XII, and a ratchet segment comprising four ratchet teeth is generally indicated by VI. Again, the ratchet segment VI is actually an axial extension of four ratchet teeth of the segment XII, as indicated in FIGURE 12.

In a generally similar fashion, the gear member G2 shown in FIGURES 14–16 is provided with apertures 72L, 72R, 71T, and 71B, an interior rectangular opening 70, and an annular rib 73, corresponding respectively to the apertures 62L, 62R, 61T, and 61B, the rectangular opening 60, and the rib 63 of the gear member G1. Likewise, the gear member G2 is provided with four ratchet segments (two on each side of the rib 73), but in this instance the two ratchet segments on one side of the gear member G2 (generally indicated by X and V) respectively comprise eight and three ratchet teeth each, and the two ratchet segments on the other side of the gear member G2 (generally indicated by XII' and VI') respectively comprise nine and three ratchet teeth each. The ratchet segment V comprises an extension of three ratchet teeth of the ratchet segment X, and the ratchet segment VI' comprises an extension of three ratchet teeth of the ratchet segment XII'.

As hereinafter described, each of the ratchet segments IV, V, VI, VI', VIII, X, XII, and XII' may be adapted to cooperate with the ratchet credit wheel 27 for the removal of two, three, four, three, six, eight, ten, and nine credit units respectively (each credit unit being equal to the angular spacing between the ratchet teeth of the ratchet credit wheel 27) in order to effect multiple pricing for album or long-playing records in a coin-operated phonograph installation.

Of course, only one of the gear members G1 and G2 is utilized at a given time, and the gear member not being used may be stored in the multiple pricing credit mechanism 1, as by passing a screw (not shown) through one of the apertures of the gear member and through an aperture 66 of the frame 2. A larger aperture 65 is also provided on the frame 2 so that the relatively larger ratchet segment of the particular gear member may pass therethrough.

Figure 10:
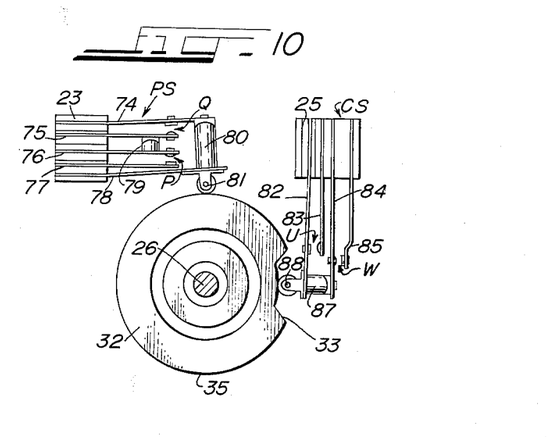
FIGURE 10 is a simplified diagram of a motor driven cam and of a pulse switching assembly and a carry-over switching assembly operated thereby.

The previously mentioned pulse switching assembly PS and carry-over switching assembly CS are mounted on the frame 2 by means of the respective bolt assemblies generally indicated by B1 and by B2 so as to dispose the assemblies PS and CS relative to the cam 32 in the manner illustrated in FIGURE 10. The pulse switching assembly PS comprises blades 74–78 which are mounted in an insulating block 23. An insulating spacer 79 separates the blades 75 and 76, and contacts are disposed between the blades 74 and 75 to define a normally closed anti-cheat switch indicated by Q and between blades 76 and 77 to define a normally closed single subtract start switch indicated by P. A cylindrical plug 80 extends from blade 74 toward blade 78, and blade 78 is provided with a cam follower roller 81 which is adapted to cooperate with the surface of the cam 32. When the cam follower roller 81 is received in the dwell recessed surface 33 of the cam 32, the switches Q and P will be in their normally closed position; however, as the cam 32 rotates so as to dispose the cam follower roller 81 adjacent the lobe raised surface 35 of the cam 32 (as shown in FIGURE 10), the switches Q and P are opened.

The carry-over switching assembly CS comprises blades 82–85 which are affixed to an insulating block 25. Contacts are provided between blades 82 and 83 and between blades 84 and 85 to define normally opened carry-over switches respectively indicated by U and W. A cylindrical plug 87 extends from blade 84 toward blade 82, and blade 82 is provided with a cam follower roller 88 which is adapted to cooperate with the cam 32. When the cam follower roller 88 is received within the dwell recess surface 33 of the cam 32 (as shown in FIGURE 10), the switches U and W maintain their normally opened positions, but when the cam 32 rotates so as to dispose the cam follower roller 88 adjacent the lobe recessed surface 35 of the cam 32, the switches U and W are closed.

A shaft 90 is affixed to the frame 2, and a spring 91 interconnects an eyelet 93 (affixed to bolt assembly B1) and a lever 92 which is pivotally mounted on the shaft 90. The lever 92 is normally biased upwardly (relative to its FIGURE 1 disposition) adjacent an upturned flange 94 of the frame 2. As best shown in FIGURE 6, a catch portion 95 extends from the lever 92 toward the path of movement of the tear-shaped latch 42 and the barrel mounting 50, and a trigger lug 96 is provided on the exterior of the barrel mounting 50 to engage the catch portion 95, for a purpose hereinafter described.

Figure 2:
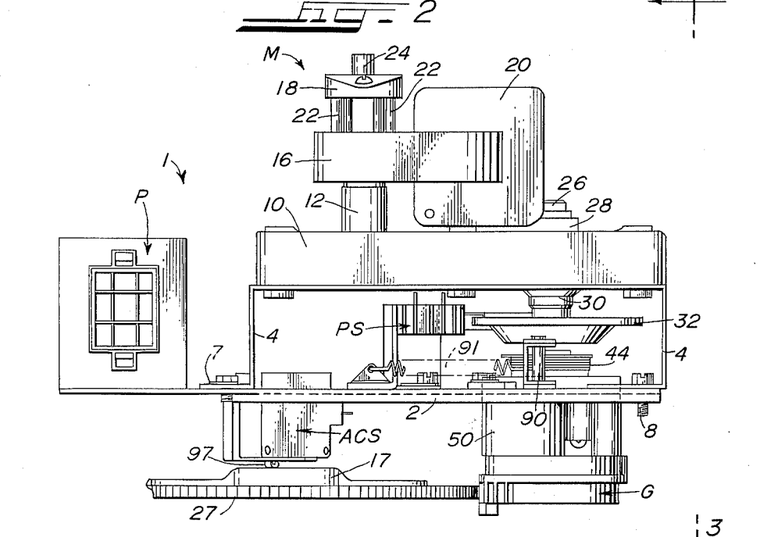
FIGURE 2 is a side elevational view taken along the line 2—2 of FIGURE 1 and showing schematically a ratchet credit wheel adapted to cooperate with the multiple pricing credit mechanism shown in FIGURE 1.

A normally closed album credit switching assembly generally indicated by ACS is affixed to a bracket 98 which is provided with an elongated arcuate slot 99. Bolts 100 and 101 pass through the frame 2 and through the slot 99 so as to mount the album credit switching assembly ACS within an aperture 108 provided in the frame 2. As best shown in FIGURE 2, the album credit switching assembly ACS is provided with a cam follower roller 97. The cam follower roller 97 is situated in the path of movement of a cam lobe 17 provided on the surface of the ratchet credit wheel 27 (FIGURES 1 and 2) such that engagement and disengagement of the cam lobe 17 and the cam follower roller 97 causes the album credit switch assembly ACS to open and close, respectively. The bracket 98 is provided with a tab T, and the surface of the frame 2 is provided with a series of index lines generally indicated by L. The bolts 100 and 101 may be loosened so that the album credit switching assembly ACS can be repositioned at various positions relative to a reference position of the cam lobe 17, with the relative positioning being correlated by the relative positioning of the tab T and the index lines L.

For example, at a zero credit or standby position of the ratchet credit wheel 27, the cam lobe 17 will engage the cam follower roller 97 so as to inactivate the album credit switching assembly ACS. However, after a predetermined extent of rotation of the ratchet credit wheel 27 (e.g., an extent of rotation corresponding to the establishment of twelve credit values), the cam lobe 17 will clear the relatively stationary cam follower roller 97 so as to activate the album credit switching assembly ACS. This activation of the album credit switching assembly ACS may be set to occur upon the establishment of four, five, six, eight, ten, or twelve credit values (as indicated by the extent of rotation of the ratchet credit wheel 27) in accordance with the amount of credit deemed appropriate for the selection of an album or long-playing record (e.g., it may be desired to sell album records for as little as four credits per play or for as much as twelve credits per play). These variations for album pricing may be readily coded in the multiple pricing credit mechanism 1 by manual movement of the bracket 98 relative to the frame 2. In actual practice, the index lines L are provided with appropriate indicia so that one could readily determine the pricing value for an album selection by the positioning of the tab T relative to the index lines L.

Figure 17:
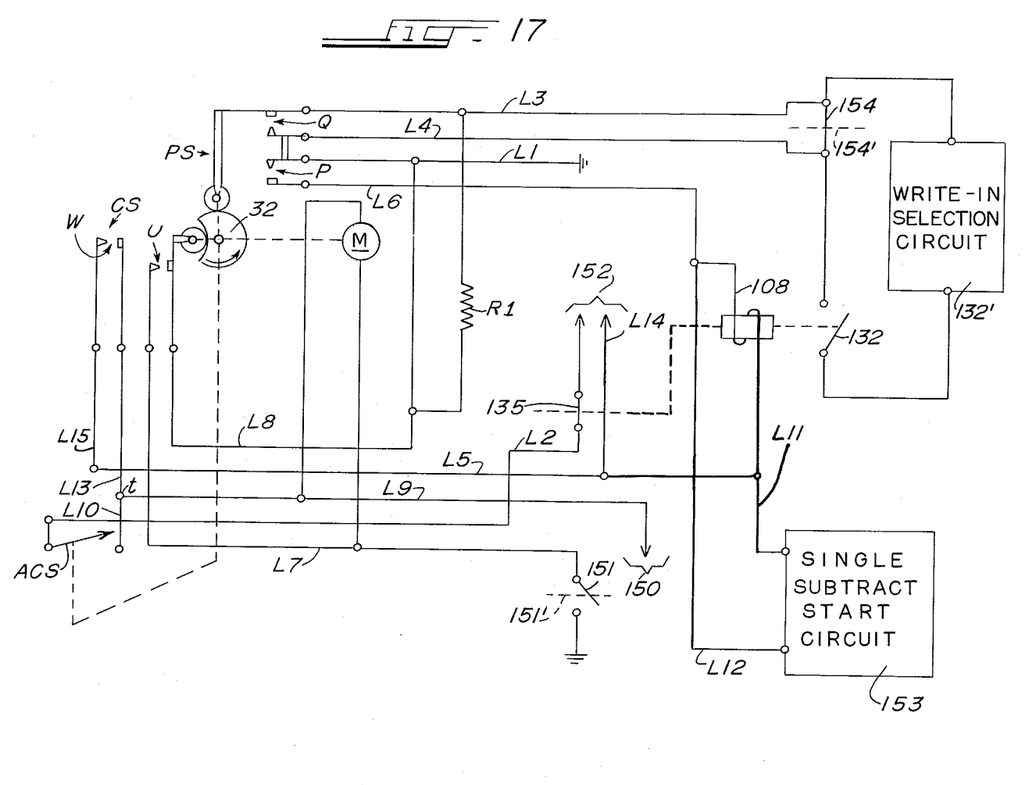
FIGURE 17 is a simplified circuit diagram illustrating certain circuitry means of the multiple pricing unit and the anti-cheating function accomplished thereby.

The previously described motor M, rotary cam 32, pulse switching assembly PS, carry-over switching assembly CS, and album credit switching assembly ACS cooperate with certain circuitry elements schematically illustrated in FIGURE 17. As shown therein, the motor M is connected across leads L7 and L9. Lead L9 is connected at one end to a terminal t and at its opposite end to an album credit signal light (not shown), as indicated at 150, and lead L7 is connected at one end to the previously described switch U of the carry-over switching assembly CS and at its other end to a normally opened switch 151. Switch 151, which is adapted to be temporarily closed upon the selection of an album record by conventional means (not shown), as indicated at 151', connects lead L7 to ground. The album credit switching assembly ACS is connected by a lead L10 to terminal t and by a lead L2 to a normally closed series switch 135, which connects to a power source, as indicated at 152. Switch 135 is adapted to be momentarily opened upon energization of a single subtract relay 108 which is connected between leads L5 and L6. The single subtract relay 108 is also connected by leads L11 and L12 across a single subtract start circuit indicated by 153. The single subtract relay 108 (which is energized by the single subtract start circuit 153 upon selection of a single or regular play) is adapted to remove either one, two, or three credit units from the ratchet credit wheel 27 upon the selection of a single or regular record, in substantially the manner described in the aforementioned co-pending application.

Single subtract relay 108 is also adapted to close a normally opened write-in switch 132, which is connected in series with a normally closed switch 154 across a write-in selection circuit indicated by 132'. As indicated by 154', the normally closed switch 154 is adapted to be opened upon selection of an album or long-playing record, so as to open-circuit the write-in selection circuit 132'.

Switch Q of pulse switching assembly PS is connected in parallel with normally closed switch 154 by leads L3 and L4. Switch P of pulse switching assembly PS is connected in series with single subtract relay 108 (by lead L6) to ground (by lead L1), and single subtract relay 108 is connected to the power source 152 by a lead L14 which connects to lead L5. Switch W of carry-over switching assembly CS is connected between lead L5 and terminal t (by leads L15 and L13 respectively). Switch U of carry-over switching assembly CS is connected by a lead L8 to ground (via lead L1) and by lead L7 to one side of the motor M. A control resistor R1 is connected between leads L8 and L3.

In operation, the circuitry will assume the rest or standby position shown in FIGURE 17 with the motor M de-energized and the switching assemblies CS, PS, and ACS in the opened positions shown. The ratchet credit wheel 27 will be in a zero credit or rest reference position, and the particular driving gear G which is utilized will be disengaged from the ratchet credit wheel 27. For purposes of description, it may be assumed that the driving gear member G2 is utilized for removing credit values from the ratchet credit wheel 27, with the ratchet segment X thereof being adapted to engage the teeth of the ratchet credit wheel 27 by appropriate positioning of the barrel mounting 50 on the clutch bearing 38 via the set screw 49, i.e., a setting of the gear member G2 with the face thereof being shown in FIGURE 16 facing the barrel housing 50 and with the barrel housing 50 being spaced at an "out" position relatively away from the rotary cam 32 on the clutch bearing 38. This setting generally corresponds to the position of the driving gear G shown in FIGURE 7. It may further be assumed that the album credit switching assembly ACS is positioned relative to the frame 2 (and therefore relative to the rest or zero credit position of the cam lobe 17 of the ratchet credit wheel 27) such that ten credit values must be established by rotation of the ratchet credit wheel 27 in order to activate the album credit switching assembly ACS.

When a customer then deposits coins in the coin-operated phonograph, the ratchet credit wheel 27 is caused to rotate (by conventional means not shown) in an amount corresponding to the amount of credit established by the deposit of the coins. If ten or more credit units are established by rotation of the ratchet credit wheel 27, the album credit switching assembly ACS will be closed, since the cam lobe 17 of the ratchet credit wheel 27 will clear the cam follower roller 97 as soon as ten or more units of credits are established. When this occurs, the top side of motor M (relative to the circuit disposition shown in FIGURE 17) will be connected to power source 152 via closed switch 135, lead L2, closed album credit switching assembly ACS, lead L10, and lead L9. Also, the album credit select light indicated at 150 will be energized since it is also connected to lead L9. Upon illumination of the album credit select light, the customer realizes that the coin-operated phonograph is set for an album selection, and, when such a selection is made, switch 151 is closed (as indicated at 151') so as to ground and thereby to energize the motor M. The motor M then commences to rotate, and the shaft 26 and its attached rotary cam 32 rotate in the direction indicated by the arrow in FIGURE 17, so as to close switches U and W of the carry-over switching assembly CS (as the cam follower roller 88 of carry-over switching assembly CS leaves the dwell recess surface 33 of the rotary cam 32 and engages the lobe raised surface 35 thereof). Also, the ratchet segment X of the gear member G2 starts to engage the ratchet teeth of the ratchet credit wheel 27 in order to effect rotation thereof in a credit subtracting direction. As the rotary cam 32 rotates, the switches U and W remain closed so as to self-lockingly energize motor M from power source 152 through lead L14, lead L5, closed switch W, lead L13, lead L9, motor M, lead L7, closed switch U, lead L8, and lead L1 to ground. Thus, even though the album credit switching assembly ACS will eventually be opened as credit is removed down to a nine or less credit unit position (due to engagement of the gear member G2 with the ratchet credit wheel 27), the motor M will continue to rotate for one cycle of revolution until the switches U and W are again opened by virtue of alignment of the cam follower roller 88 of carry-over switching assembly CS with the dwell recess surface 33 of the rotary cam 32.

The selection of an album record will open normally closed switch 154 (as indicated at 154') so as to open-circuit the write-in selection circuit 132'. However, as the rotary cam 32 rotates, the switches Q and P of pulse switching assembly PS will be closed when the cam follower roller 81 of the pulse switching assembly PS leaves the lobe raised surface 35 of the rotary cam 32. When the dwell recessed surface 33 of the rotary cam 32 aligns with the cam follower roller 81, switch Q will close, which action in turn causes switch P to close (i.e. switch Q closes before switch P). When switch Q closes, switch 154 is shunted, and when switch P closes, single subtract relay 108 is energized from power source 152 through lead L14, lead L5, relay 108, lead L6, closed switch P, and lead L1 to ground.

When single subtract relay 108 is energized, switch 132 is closed to complete the write-in selection circuit 132' which is now connected across closed switch 132 and closed switch Q in series. Energization of the single subtract relay 108 also opens switch 135 (which may be accomplished via a timing relay arrangement, not shown, as in the aforementioned co-pending application), so as to insure de-energization of motor M after the playing of each album selection. Also, energization of single subtract relay 108 serves to subtract (in this instance) two credit values from the ratchet credit wheel 27 (by means not shown, although in the manner described in the aforementioned co-pending application). Thus, rotation of the gear member G2 (i.e., ratchet segment X thereof) removes eight credit values from the ratchet credit wheel 27 prior to energization of single subtract relay 108, which then removes two additional credit units for a total of ten credit units subtracted for the album selection.

Figure 8:
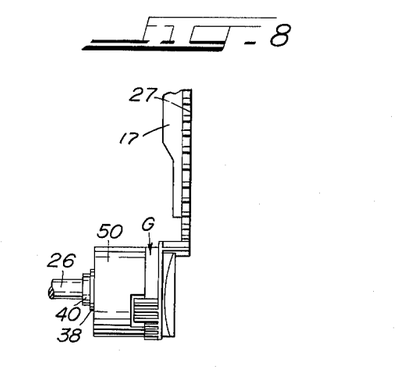
FIGURE 8 is a view similar to FIGURE 7 showing another position for interengagement of the driving gear and the ratchet credit wheel.

If it is desired to effect a different pricing sequence for album selections, it is possible to alter the position of the barrel mounting 50 on the clutch bearing 38 so that the ratchet segment V of gear member G2 is aligned with the ratchet teeth of the ratchet credit wheel 27 (i.e. an "in" position generally corresponding to the position of the driving gear G in FIGURE 8). Correspondingly, the album credit switching assembly ACS is moved relative to frame 2 (and therefore relative to the rest or zero credit position of the cam lobe 17 of ratchet credit wheel 27) so as to establish album credit after five credit units are indicated by rotation of ratchet credit wheel 27. A corresponding series of events in this position would result in a removal of three credit units by rotation of the gear member G2 and of an additional two credit units upon energization of single subtract relay 108 for a total of five credit units removed per album selection.

Figure 7:
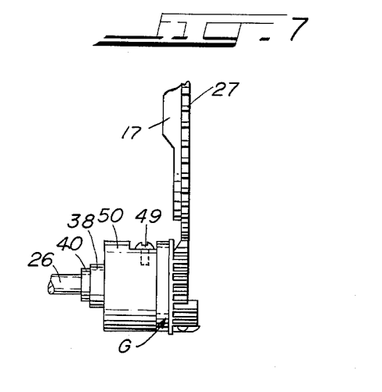
FIGURE 7 is a fragmentary schematic view showing one position for interengagement of a driving gear and the ratchet credit wheel.

Likewise, the gear member G2 could be reversed so that the side thereof shown in FIGURE 14 is placed adjacent the barrel mounting 50. In this manner, either of the ratchet segments VI' or XII' could be aligned with the ratchet teeth of the ratchet credit wheel 27 depending upon the positioning of the set screw 49 so as to define an "in" or an "out" position (i.e., as generally shown in FIGURES 8 and 7 respectively). When the ratchet segment XII' is utilized, nine credit units are subtracted by rotation of the gear member G2, and (in this instance) an additional three credit units are subtracted by energization of single subtract relay 108 for a total of twelve credit units per album selection. It is also possible to establish a six or a twelve credit unit price for album selections by utilization of the respective ratchet segments VI or XII of the gear member G1 (by appropriate placement of the said gear member adjacent the barrel mounting 50). In this instance, four or ten credit units would be subtracted by rotation of the gear member, and an additional two credit units would be subtracted upon energization of single subtract relay 108 for a total of six or twelve credit units per album selection. Likewise, the ratchet segments IV and VII can be utilized to subtract two or six credit units respectively, which, in conjunction with two credit units removed by single subtract relay 108, respectively serve to establish four or eight credit units per album selection as the applicable price.

Since it is possible to set the single subtract relay 108 to remove variable units of credit, as desired, such as one, two, or three credit units for each momentary energization of the relay 108 (for example, by a variably positioned solenoid actuated subtract pawl, substantially as described in the aforementioned co-pending application), it is possible by various combinations of any one of the four ratchet segments with various settings of the single subtract relay 108 operation to effect a wide variety of desired pricing values for album selections. As described herein, album selection credit removal is accomplished by a first degree of credit removal due to rotation of a driving gear G and by a second degree of credit removal due to actuation of a single subtract relay 108. However, it should be understood that this arrangement represents a preferred commercial practice utilized in order to avoid duplicating control systems (not shown) of the coin-operated phonograph, which control systems are actuated by the single subtract relay 108. It is of course possible to adapt the disclosed embodiment to one in which a driving gear G (having alternate variable ratchet segments) could be utilized in and of itself to subtract the requisite credit units.

It should be noted that the normally closed switch 154 and the shunt switch Q associated therewith perform an important anti-cheating function. Ordinarily, upon a single selection, the customer activates the single subtract start circuit 153 so as to energize the single subtract relay 108 in a conventional manner (for example, as described in the aforementioned co-pending application). This action closes switch 132 in order to activate the write-in selection circuit 132' in accordance with the customer's signal. Sometimes, however, a customer may deposit coins sufficient for a single selection and may take the single selection and almost simultaneously attempt to make an album selection in order to achieve an album play for a single credit deposit. To avoid this potential cheating arrangement, the switch 154 is provided so that any album selection will automatically open the said switch (as indicated at 154') in order to open-circuit the write-in selection circuit 132'. Unless the album credit switching assembly ACS has been closed by the deposit of sufficient coins to establish album credits, the switch Q will also remain opened so that the write-in album selection circuit 132' cannot be completed. However, if the album credit switching assembly ACS is closed, motor M is energized so as to eventually close switch Q by means of rotary cam 32, and thus switch 154 is shunted by means of closed switch Q so that the write-in selection circuit 132' can be completed for the album selection.

The provision of the tear-shaped latch 42 and its associated torsion spring 44 serves as a safety feature in case the driving gear G remains intermeshed with the ratchet credit wheel 27 after the motor M is de-energized. This might occur, for example, if a customer manages to energize the motor M (as by shaking the coin-operated phonograph) at a time when the driving gear G is set to remove more credit units than are established on the ratchet credit wheel 27. Thus, when the ratchet credit wheel 27 is returned to its zero credit position, the driving gear G, which should be cleared at that time, might still be intermeshed with the ratchet credit wheel 27. An attempt by a subsequent customer to establish credit by the deposit of coins could then be ineffectual since the driving gear G would freeze the ratchet credit wheel 27 in position. In order to obviate these difficulties, the tear-shaped latch 42 and its associated torsion spring 44 form an induced torque clutch means for releasing the clutch bearing 38 from fixed engagement with the pin 34 of the shaft 26 so that positive credit rotation of the ratchet wheel 27 can be accomplished while the driving gear G clears from intermeshing relationship therewith. The force stored in the torsion spring 44 tends to rotate the driving gear G in a direction consistent with the establishment of positive credit on the ratchet credit wheel 27. However, in the course of normal operations, the described torque-clutch arrangement is not required, and, accordingly, the lug 96 of the barrel mounting 50 is provided to trip the trigger portion 95 of the lever 92 (so as to release the tear-shaped latch 42 to its normally biased position) as soon as the driving gear G clears from engagement with the ratchet credit wheel 27. Thus, the force stored in the torsion spring 44 is automatically dissipated during each cycle of revolution as soon as the clearing of the driving gear G from the ratchet credit wheel 27 insures that the reverse torque-clutch safety aid will not be needed. It is thus apparent that the tear-shaped latch 42 serves to wind the torsion spring 44 which, in conjunction with the slip-clutch arrangement formed between the pin 34 of shaft 26 and the clutch bearing 38, aids in the removal of the driving gear G if the said gear is still engaged with the ratchet credit wheel 27 at the completion of an abnormally initiated motor cycle.

While the invention has been described with reference to its utilization in a coin-operated phonograph installation. It should be understood that the multiple pricing credit mechanism described herein may be utilized in a wide variety of other vending equipment environments in which a flexibility of pricing sequences is desired. It should further be understood that various changes, modifications, and alterations may be effected in the details of construction and arrangements for the various elements, without departing from the spirit and the scope of the instant invention, as defined in the appended claims.

What is claimed is:

1. A multiple pricing credit mechanism of the character described, adapted for subtracting credit from a ratchet credit wheel in response to a given type of selection, the said ratchet credit wheel being of the type which may be rotated in a given direction in amounts corresponding to the credit units established by the deposit of coins in coin-responsive equipment, and comprising:
   a frame;
   a shaft journaled for rotation on the frame;
   a mounting member which is axially slidable on the shaft;
   a driving gear detachably affixed to the mounting member;
   a first ratchet segment on the driving gear adapted to intermesh with the teeth of the ratchet credit wheel in order to effect rotation thereof by a first amount;
   a second ratchet segment on the driving gear adapted to intermesh with the teeth of the ratchet credit wheel in order to effect rotation thereof by a second amount;
   means for positioning the mounting member at a first axially fixed position on the shaft wherein the first ratchet segment is aligned with the ratchet teeth of the ratchet credit wheel and for repositioning the mounting member at a second axially fixed position on the shaft wherein the second ratchet segments is aligned with the ratchet teeth of the ratchet credit wheel;
   motor means adapted to rotate the shaft in a direction such that the driving gear effects rotation of the ratchet credit wheel in a direction opposite to the said given direction; and
   means for activating the motor means so as to effect one cycle of revolution for the shaft for each selection of the said given type which is made in the coin-responsive equipment,
   whereby the said given type of selection may be priced at either a first or a second amount corresponding respectively to the amounts of rotation of the ratchet credit wheel effected by the ratchet segments.

2. A mechanism as claimed in claim 1 wherein the first ratchet segment comprises a first set of ratchet teeth and the second ratchet segment comprises a second set of ratchet teeth in the form of extensions of certain ones of the ratchet teeth of the said first set.

3. A mechanism as claimed in claim 2 in which the said first set comprises six ratchet teeth and the said second set comprises two ratchet teeth.

4. A mechanism as claimed in claim 2 wherein the said first set comprises ten ratchet teeth and the said second set comprises four ratchet teeth.

5. A mechanism as claimed in claim 2 wherein the said first set comprises eight ratchet teeth and the said second set comprises three ratchet teeth.

6. A mechanism as claimed in claim 2 wherein the said first set comprises nine ratchet teeth and the said second set comprises three ratchet teeth.

7. A mechanism as claimed in claim 1 wherein the said means for activating the motor means comprises:
   credit switching means for energizing the motor means in response to the establishment of a pre-determined number of credit units by rotation of the ratchet credit wheel; and
   carry-over switching means for maintaining the motor means in an energized state for one cycle of revolution thereof,
   whereby the motor means are energized for one cycle of revolution thereof when sufficient credit for the said given type of selection is established.

8. A mechanism as claimed in claim 7 wherein the said credit switching means comprises:
   switch means in series with the motor means;
   cam means on the ratchet credit wheel;
   means for mounting the switch means on the frame at any one of several positions relative to a rest reference position of the cam means of the ratchet credit wheel; and
   cam follower means adapted to coact with the cam means in order to activate the switch means for energization of the motor means in response to the establishment of a predetermined number of credit units by rotation of the ratchet credit wheel from its rest reference position.

9. A mechanism as claimed in claim 7 wherein the said carry-over switching means comprises:
   a rotary cam having a dwell recessed surface and a lobe raised surface;
   normally opened carry-over switch means in series with the motor means; and
   cam follower means adapted to coact with the rotary cam so as to close the normally opened carry-over switch means when in contact with the lobe raised surface of the rotary cam and to open the carry-over switch means when in contact with the dwell recessed surface of the rotary cam.

10. A mechanism as claimed in claim 1 and further comprising anti-cheat means adapted to cooperate with a normally closed switch which is connected in series with a selection circuit and which is adapted to be opened when a selection of the said given type is made, which comprises:
    a normally opened switch connected in parallel with the said normally closed switch; and
    cam means responsive to energization of the motor means for closing the said normally opened switch,
    whereby the normally opened switch is closed in order to shunt the opening of the normally closed switch when a selection of the said given type is made.

11. Anti-cheat circuitry means for use with a selection circuit adapted to operate in coin-responsive equipment which dispenses a first type of selection upon establishment of a first amount of credit and a second type of selection upon the establishment of a second amount of credit, which comprises:
    a normally closed second selection switch in series with the said selection circuit and adapted to be opened whenever a selection of the said second type is made;
    a normally opened relay switch in series with the said selection circuit and with the said second selection switch;
    relay means adapted to close the said relay switch;
    first selection start circuit means for energizing the relay means in response to a selection of the first type;
    a normally opened shunt switch connected in parallel with the second selection switch;
    a normally opened second selection start switch connected in series with the relay means;
    rotary cam means adapted to close first the shunt switch and then the second selection start switch once during each cycle of revolution thereof; and
    means for rotating the rotary cam means in response to a selection of the second type,
    whereby a selection of the first type activates the first selection start circuit means for energizing the relay means so as to complete the selection circuit through the said relay switch and through the said second selection switch, and a selection of the second type open-circuits the said second selection switch and activates the rotary cam so as to shunt the said second selection switch via the said shunt switch and to energize the relay means via the said second selection switch, thereby to complete the selection circuit through the said shunt switch and through the said relay switch.

12. A multiple pricing credit mechanism of the character described, adapted for subtracting credit from a ratchet credit wheel in response to a given type of selection, the said ratchet credit wheel being of the type which may be rotated in a given direction in amounts corresponding to the credit units established by the deposit of coins in coin-responsive equipment, and comprising:
a frame;
a shaft journaled for rotation on the frame;
a driving gear;
means for detachably mounting the driving gear on the shaft for rotation therewith and for axially slideable movement thereon;
a first ratchet segment on the driving gear adapted to intermesh with the teeth of the ratchet credit wheel in order to effect rotation thereof by a first amount;
a second ratchet segment on the driving gear adapted to intermesh with the teeth of the ratchet credit wheel in order to effect rotation thereof by a second amount;
means for positioning the driving gear at a first axially fixed position on the shaft wherein the first ratchet segment is aligned with the ratchet teeth of the ratchet credit wheel and for repositioning the mounting member at a second axially fixed position on the shaft wherein the second ratchet segment is aligned with the ratchet teeth of the ratchet credit wheel;
drive means adapted to rotate the shaft in a direction such that the driving gear effects rotation of the ratchet credit wheel in a direction opposite to the said given direction; and
means for activating the drive means so as to effect one cycle of revolution for the shaft for each selection of the said given type which is made in the coin-responsive equipment,
whereby the said given type of selection may be priced at either a first or a second amount corresponding respectively to the amounts of rotation of the ratchet credit wheel effected by the ratchet segments.

13. A unitary driving gear adapted to rotate a ratchet credit wheel and comprising:
an integral cylindrical base;
a first ratchet segment comprising a first set of ratchet teeth circumferentially spaced on the surface of the cylindrical base;
a second ratchet segment comprising a second set of ratchet teeth in the form of integral extensions in an axial direction away from the cylindrical base of certain ones of the ratchet teeth of the said first set;
a third ratchet segment comprising a third set of ratchet teeth circumferentially spaced on the surface of the cylindrical base; and
a fourth ratchet segment comprising a fourth set of ratchet teeth in the form of integral extensions in an axial direction away from the cylindrical base of certain ones of the ratchet teeth of the said third set.

14. A unitary driving gear adapted to rotate a ratchet credit wheel and comprising:
an integral cylindrical base;
a first ratchet segment comprising a first set of six ratchet teeth circumferentially spaced on the surface of the cylindrical base;
a second ratchet segment comprising a second set of two ratchet teeth in the form of integral extensions in a given axial direction away from the cylindrical base of two adjacent ratchet teeth of the said first set;
a third ratchet segment comprising a third set of ten ratchet teeth circumferentially spaced on the surface of the cylindrical base; and
a fourth ratchet segment comprising a fourth set of four ratchet teeth in the form of integral extensions in an axial direction away from the cylindrical base and opposite to the said given axial direction of four adjacent ratchet teeth of the said third set.

15. A unitary driving gear adapted to rotate a ratchet credit wheel and comprising:
an integral cylindrical base;
a first ratchet segment comprising a first set of eight ratchet teeth circumferentially spaced on the surface of the cylindrical base;
a second ratchet segment comprising a second set of three ratchet teeth in the form of integral extensions in a given axial direction away from the cylindrical base of three adjacent ratchet teeth of the said first set;
a third ratchet segment comprising a third set of nine ratchet teeth circumferentially spaced on the surface of the cylindrical base; and
a fourth ratchet segment comprising a fourth set of two ratchet teeth in the form of integral extensions in an axial direction away from the cylindrical base and opposite to the said given axial direction of three adjacent ratchet teeth of the said third set.

References Cited by the Examiner

UNITED STATES PATENTS

| | | | |
|---|---|---|---|
| 1,696,049 | 12/28 | Miller | 74—435 X |
| 1,833,644 | 11/31 | Haegele | 74—435 |
| 2,209,703 | 7/40 | Mettler. | |
| 2,914,958 | 12/59 | Changy | 74—435 X |

SAMUEL F. COLEMAN, *Primary Examiner.*

ERNEST A. FALLER, *Examiner.*